United States Patent [19]

Thomson

[11] Patent Number: 4,556,869
[45] Date of Patent: Dec. 3, 1985

[54] MULTI-FUNCTION DATA SIGNAL PROCESSING METHOD AND APPARATUS

[75] Inventor: David J. Thomson, New Providence, N.J.

[73] Assignee: AT&T Bell Laboratories, Murray Hill, N.J.

[21] Appl. No.: 737,569

[22] Filed: May 23, 1985

Related U.S. Application Data

[63] Continuation-in-part of Ser. No. 502,198, Jun. 8, 1983, abandoned.

[51] Int. Cl.⁴ .......................................... H03K 13/24
[52] U.S. Cl. .............................. 340/347 DD; 375/55; 375/34; 332/18; 360/42; 328/14
[58] Field of Search ..................... 375/52, 55, 57, 67, 375/87, 34; 332/16 R, 18, 9 R; 340/347 DD; 360/40, 44, 42; 364/718; 328/14

[56] References Cited

U.S. PATENT DOCUMENTS

| | | | |
|---|---|---|---|
| 3,011,165 | 11/1961 | Angel et al. | 340/347 |
| 3,048,784 | 8/1962 | Scherer | 328/14 |
| 3,183,442 | 5/1965 | Filipowsky | 340/347 DD |
| 3,774,178 | 11/1973 | Curtis | 340/174 |
| 3,962,647 | 6/1976 | Richman | 340/347 DD |
| 4,011,405 | 3/1977 | Ridout | 375/18 |
| 4,100,541 | 7/1978 | Quesnell, Jr. | 340/347 DD |
| 4,410,955 | 10/1983 | Burke | 364/718 |

OTHER PUBLICATIONS

"Advanced Mobile Phone Service: A Subscriber Set for the Equipment Test," *Bell System Technical Journal*, vol. 58, No. 1, Jan. 1979, pp. 123–143, by R. E. Fisher.
"Digital Generation of Data Modulated Waveforms," *Microelectron Reliab.*, vol. 22, No. 4, 1982, pp. 759–767, S. M. Bozic et al.

*Primary Examiner*—Charles D. Miller
*Attorney, Agent, or Firm*—Charles Scott Phelan

[57] ABSTRACT

A data signal is processed to change its form and spectral content without introducing undesirable frequency and amplitude effects. Multiple data signal states, which determine the essential characteristics of the output signal wave configuration, are utilized in conjunction with clock signals at a rate substantially in excess of twice the largest frequency component of the data signal in order to read from a memory a bit-duration waveform sample set representing the desired output signal wave configuration. Predistortion to compensate for anticipated transmission effects is also included in that configuration. In one embodiment, an input data signal is in an NRZ format and is processed for conversion to the biphase, or Manchester, format by a ROM table look-up function addressed jointly by the input signal states and the clock signals.

4 Claims, 6 Drawing Figures

MULTI-FUNCTION DATA SIGNAL PROCESSING METHOD AND APPARATUS

CROSS REFERENCE TO RELATED APPLICATIONS

This application is a continuation-in-part of my copending application Ser. No. 502,198 filed June 8, 1983 now abandoned.

BACKGROUND OF THE INVENTION

This invention relates to a data signal processing method and apparatus and, more particularly, to such method and apparatus which are useful for functions such as signal bit code conversion and pre-equalization.

It is well known in the art to convert between digital signal codes employing different combinations of binary ONE and ZERO signal bits to represent the same information. One example, employing a magnetic core matrix, is the U.S. Pat. No. 3,011,165 to A. M. Angel et al. However, in these systems, individual bit signals are usually represented in the same way in both codes; that is, a binary ONE bit is represented in the same way in both codes, and a binary ZERO is represented in the same way in both codes.

Binary signal bits can be represented in different ways in both baseband and modulated formats. For example, in baseband, they may be represented in a pulse/no-pulse format, or a bipolar nonreturn-to-zero (NRZ) format, or a biphase Manchester format, or other formats. Similarly, data bit signals in modulated arrangements may be represented in frequency or phase-shift keyed arrangements, amplitude modulation, or frequency modulation. Regardless of the bit representation format, it is sometimes useful to change the individual bit representation format, sometimes also called bit representation code or modulation. In the U.S. Pat. No. 4,100,541 to H. A. Quesnell, Jr., binary signal bits in an NRZ-type of format are converted to the Manchester format by a multiplexing technique. A D. E. Curtis U.S. Pat. No. 3,774,178 employs a two-bit shift register and associated logic clocked at the bit rate to convert NRZ code to a Pouliart code with state transitions in mid-bit of ONEs, and between adjacent ZEROs. "Digital Generation of Data Modulated Waveforms," by S. M. Bozic et al. in *Microelectron. Reliab.*, Vol. 22, No. 4, pp. 759–767, 1982, shows the clocking of each input data bit at a higher rate than the data to select one or the other of two forms of the same input bit state for application to a digital transversal filter which produces a modulator output.

It is also known to store in memory as sample amplitude value sets certain signal wave segments which are themselves of a type usually generated by analog circuits and so can be easily converted to sets of digitally encoded samples for convenient storage. Those segments are then read from addresses which are selectable in response to address signals generated as a joint function of input data bits and some other information dependent function. Segments read out are are combined with another function, such as readout from another memory address, to obtain a desired result which can be restored to analog sample form for use. One example is a phase shift modulator in an M. Choquet et al. U.S. Pat. No. 3,747,024 in which input data bits are converted to a combinational address by circuitry which combines them with a prior address. The stored signal element contents at the combinational address are summed in other circuitry with the contents of a plurality of previous combinational addresses to produce a data output. Similarly in a Glasson et al. U.S. Pat. No. 3,935,386, a phase modulated carrier is synthesized by addressing a stored carrier segment with an address generated by circuitry which combines an applied data element and the phase of a previously selected segment. Successive segments so addressed are overlapped and blended in additional circuitry to form the synthesized wave. More recently, a T. M. Burke et al. U.S. Pat. No. 4,410,955 shows a data stream shaping method in which extensive logic circuitry detects information state transitions in received data, selects a corresponding sinusoidal segment from a register for output, and by additional circuitry fills between transitions with an appropriate logic level signal.

The extensive circuitry required, in addition to the memory facility, in the foregoing memory-based wave generating arrangements occupy significant semiconductor space in integrated circuit embodiments. Also, the associated signal combining functions necessarily performed in that circuitry tend to limit the flexibility of practical application in terms of, e.g., applying predistortion, frequency band limiting, signal multiplexing, or types of input signals that can be accommodated.

In preparing a converted bit code for, e.g., radio transmission, certain undesired effects sometimes occur. Thus, in the Manchester bit encoder of FIG. 10 in "Advanced Mobile Phone Service—A Subscriber Set for the Equipment Test," by R. E. Fisher, *Bell System Technical Journal*, January 1979, pages 123–143, a Bessel low-pass filter is employed, following an exclusive ORing operation and integration. The filter maintains the phase relationships among the different components of the data signal and band-limits the signal to reduce the amplitude of frequency components thereof outside of the allotted radio frequency channel. However, such a filter has an output amplitude that is data-pattern sensitive. Such pattern sensitivity in output amplitude has been found to impact adversely the system error rate, and it also makes that error rate pattern-sensitive.

SUMMARY OF THE INVENTION

The present invention collects information on multiple data signal input bit states which determine the essential characteristics of a processed output signal wave configuration. Sequential and overlapping combinations of those states are utilized to address directly a memory having stored therein bit-duration waveforms and thereby cause a single corresponding waveform sample set to be read out of the memory for each combination. Each waveform represents the interbit transitions between time-adjacent bits of a different one of the possible combinations of input bit-pair states. Each bit-duration wave includes in its stored form code conversion, compansation for intersymbol distortion unique to one information-bit-combination type, and predistortion to compensate for anticipated transmission path effects on a signal waveform of that information-bit-combination type.

BRIEF DESCRIPTION OF THE DRAWING

A more complete understanding of the invention and the various features, objects, and advantages thereof, may be obtained from a consideration of the following Detailed Description in connection with the appended claims and the attached drawings in which

DETAILED DESCRIPTION

Figure 1:
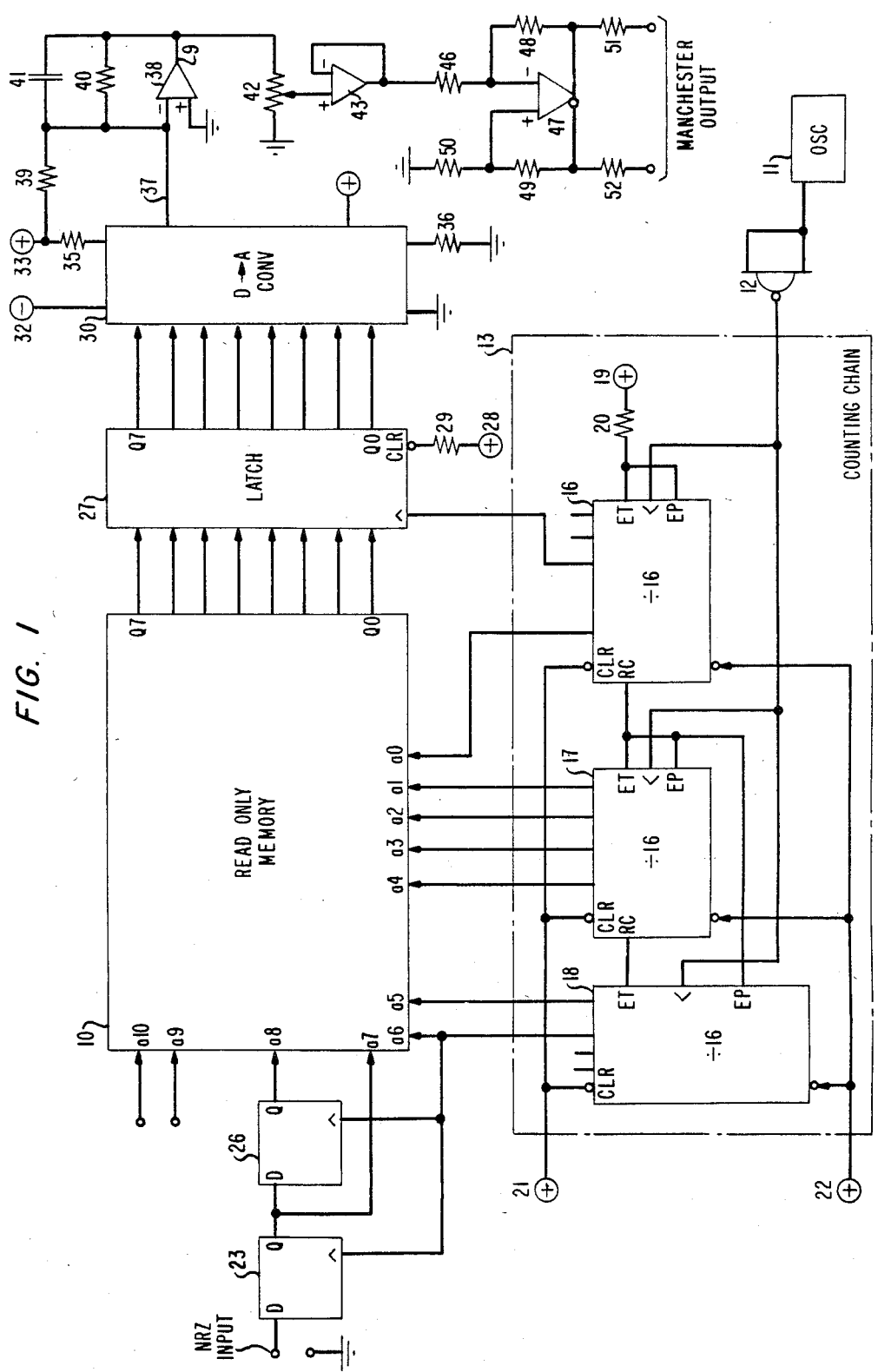
FIG. 1 is a schematic diagram of a signal processing circuit of the invention as applied to a data signal bit form converting arrangement.

In FIG. 1, the signal processing circuit is arranged for converting an NRZ input data signal, which is unbalanced with respect to ground, into a Manchester output data signal, which is balanced with respect to ground. The latter signal is conveniently adapted for application, for example, to modulate a radio transmitter (not shown) output signal. The intermediate signal processing, accomplished between the input and the output in FIG. 1, is illustratively a bit code conversion which is accomplished by a combinatorial table look-up function using input data signal states and locally generated clock signals jointly to address a read-only memory 10 that is operated as a waveform generator. The local clock signals are produced by counting down the output of an oscillator 11. The oscillator output is applied through a buffer 12 to a counting chain 13 which is comprised of three four-bit binary counters 16, 17, and 18. Output of oscillator 11 is advantageously at a frequency which is much higher than twice the bit rate of the NRZ input data and, advantageously, an integer power of two times the data frequency; and, in an illustrative embodiment, the oscillator output was at 10.24 MHz for a signal processing circuit receiving NRZ input data at 10 kilobits per second.

The buffered oscillator output is applied in parallel to clocking inputs of the three four-bit, i.e., divide by 16, counter sections of the counting chain 13. Those are positive-edge-trigger inputs, as schematically indicated in the drawing. Both control inputs of the first stage 16 are permanently enabled by application of a positive bias from a positive potential source 19, the output of which is applied through a resistor 20. The overflow output RC of stage 16 is applied to both enabling inputs of the stage 17 so that the latter stage can be clocked only at the time of overflow of the first stage 16. Similarly, overflow outputs of the stages 16 and 17 are applied to the respective enabling inputs of the third counting section 18 so that the latter section is able to count only in response to overflow at the same time of both of the first two sections 16 and 17.

All three counting stages have their clear inputs permanently disabled by application of a positive bias from a supply 21 schematically represented by a circled plus sign. That schematic representation indicates the connection to the plus terminal of a voltage supply which has its terminal of opposite polarity connected to ground. Other voltage supplies are similarly indicated in the drawing in terms of a circled polarity sign. Similarly, the parallel loading enable inputs are also permanently disabled by application of a positive bias from a supply 22 through inverting input connections to the respective counting sections 16–18.

Outputs from all stages of the counting chain 13, except the two least significant stages of the first counting section 16 and the two most significant stages of the counting section 18, are connected to provide bit parallel, binary-coded signals identifying respective time phases. Those count phase signals will be applied during input signal bit times for the NRZ input data signal for use in a manner which will be described.

A two-bit shift register, including D-type flip-flop circuits 23 and 26, is provided to collect, i.e. obtain, information about input NRZ data signal states. That register is clocked by a bit rate clock signal, e.g., at 10 kHz, from the second stage of the third counter section 18. The NRZ input signal is applied to the D input of the first flip-flop 23, and a Q output of that flip-flop is coupled directly to the D input of the second flip-flop 26. That same Q output is further coupled, along with the Q output of the flip-flop 26, as a two-bit portion of the address information applied to the read only memory 10. Those two address bits initiate selection of a waveform held in ROM 10 and are the bits a7 and a8 in the total array of 11 address bits a0 through a10.

In a bit code conversion from NRZ to Manchester, the shape of each Manchester bit waveform is largely determined in part by the current bit state of the input NRZ data bit, and in part by the previous bit state of the same NRZ input signal. There are, thus, four possible different bit state combinations of two bits each, which determine the essential configuration of the Manchester output. Thus, the bit parallel output of the two-bit shift register, including flip-flop 23 and 26 outputs in each bit time, provides both the current and the previous bit states of the input signal to address the ROM 10. More generally stated, if n input bit states are to be used to define each output signal bit-duration configuration, then $2^n$ bit state combinations are possible. Consequently, the ROM 10 stores, i.e. holds, $2^n$ different output, bit-duration waveforms each representing the bit state transition between bits of that combination and selectable by the n bits from shift register flip-flop circuits 23 and 26 applied directly to ROM 10 address bit inputs a7 and a8 and selectable by the n bits from flip-flop circuits 23 and 26.

Each stored waveform is represented in storage by a set of 128 different binary-coded time phase sample values in the illustrative embodiment under consideration. Those values are selectable by the seven most significant bits (up to and including the 10-kHz bit) of the counter chain outputs previously noted and applied to the seven least significant bit address inputs a0 through a6 of the ROM 10. It is, thus, apparent that each two-bit address at inputs a7 and a8 causes a single waveform sample set to be read out of ROM 10 during one input data bit time and before another sample set can be selected by the next two-bit address in the next input bit time. Two additional address inputs a9 and a10 on ROM 10 are the two most significant ones of the 11 address inputs. Those two schematically represent the capability for storing and accessing additional groups of waveforms (a total of four groups in the illustration) representing different signal processing functions such as, e.g., data signal translations in different amplitude ranges for testing or for working into transmission facilities having widely different characteristics. The additional inputs are advantageously selectable by signals from either a manual controller or an automatic controller (not shown) for a system including the illustrated processing circuits.

Each stored sample value in ROM 10 is an 8-bit binary-coded character, the value of which is determined in a manner which will be subsequently described. Those binary-coded sample value characters appear on output leads designated Q0 through Q7 from the ROM 10. Sample value signals for each waveform set from ROM 10 are transmitted through further processing circuits essentially independently of previous or subsequent sample sets. To that end, values of each set are coupled to corresponding input connections of a data latch register 27 which comprises an array of eight D-type flip-flop circuits. It will be appreciated from the foregoing that the effective sample rate of the waveforms output from ROM 10 is much higher than twice the NRZ input data bit rate; and, in the illustrative embodiment, that ROM output sample rate is at 1.280 MHz. This high sample rate assures spectrum control at and above the data rate, e.g., ideally to 640 kHz from the carrier but, when quantization noise is included, illustratively, out to about 80 kHz from the carrier. The output of the third stage of the first counting chain section 16 is utilized to provide clock enabling for the input connections of latch register 27. That clocking of the latch is then at a frequency of 1.28 MHz in the illustrative embodiment.

Latch register 27 outputs are continuously enabled by virtue of the fact that the clearing input to the register is disabled by the positive bias supplied from the source 28 through a biasing resistor 29. Those latch outputs are applied to inputs of a digital-to-analog converter 30 by direct connection. Converter 30 is supplied with operating potential from a negative voltage supply 32 and a corresponding ground connection. In addition, the converter is supplied with reference current for the conversion function from a positive voltage supply 33 which is coupled through a resistor 35 to the converter and has a return path coupled to ground through a resistor 36. Since the output of ROM 10 changes once in each half-cycle of the maximum frequency of its clock address, the clocking of latch 27 at twice the maximum frequency of the ROM 10 address input loads the latch only after the ROM output has settled and thereby stabilizes inputs to converter 30.

Output from converter 30 appears as a current output on a lead 37 which is coupled to an inverting input connection of an operational amplifier 38. That amplifier is connected to perform a current-to-voltage conversion as one of its functions. To this end, its noninverting input connection is coupled to ground; and its inverting input connection is coupled through a resistor 39 from the positive supply 33. In addition, a parallel resistor-capacitor combination, including a resistor 40 and a capacitor 41, is connected to provide feedback from the amplifier output to its inverting input connection for accomplishing a single-pole of low-pass filtering for smoothing out quantizing noise at the 1.28-MHz sampling rate i.e. the ROM 10 640 kHz sample rate further sampled at 1.28 MHz by latch 27. A cut-off frequency substantially above twice the data rate, e.g., about 80 kHz has been found satisfactory. This filtering produces no significant phase shift in the data signaling band. Output from amplifier 38 is coupled by an adjustable potential divider 42 to a noninverting input connection of an operational amplifier 43. That amplifier is connected as a unity gain amplifier for providing a low impedance output through a coupling resistor 46 to an inverting input connection of a further operational amplifier 47.

Amplifier 47 is provided with a negative feedback connection through a resistor 48 to set the level of gain for the amplifier stage, and it is further provided with a negative feedback connection through an inverting output and a resistor 49 to the noninverting input connection of the amplifier. The latter input is further connected to ground through a resistor 50. This arrangement provides the amplifier with a balanced output type of operation so that it supplies to the overall output of the code converter a balanced output signal coupled through resistors 51 and 52.

Figure 2:
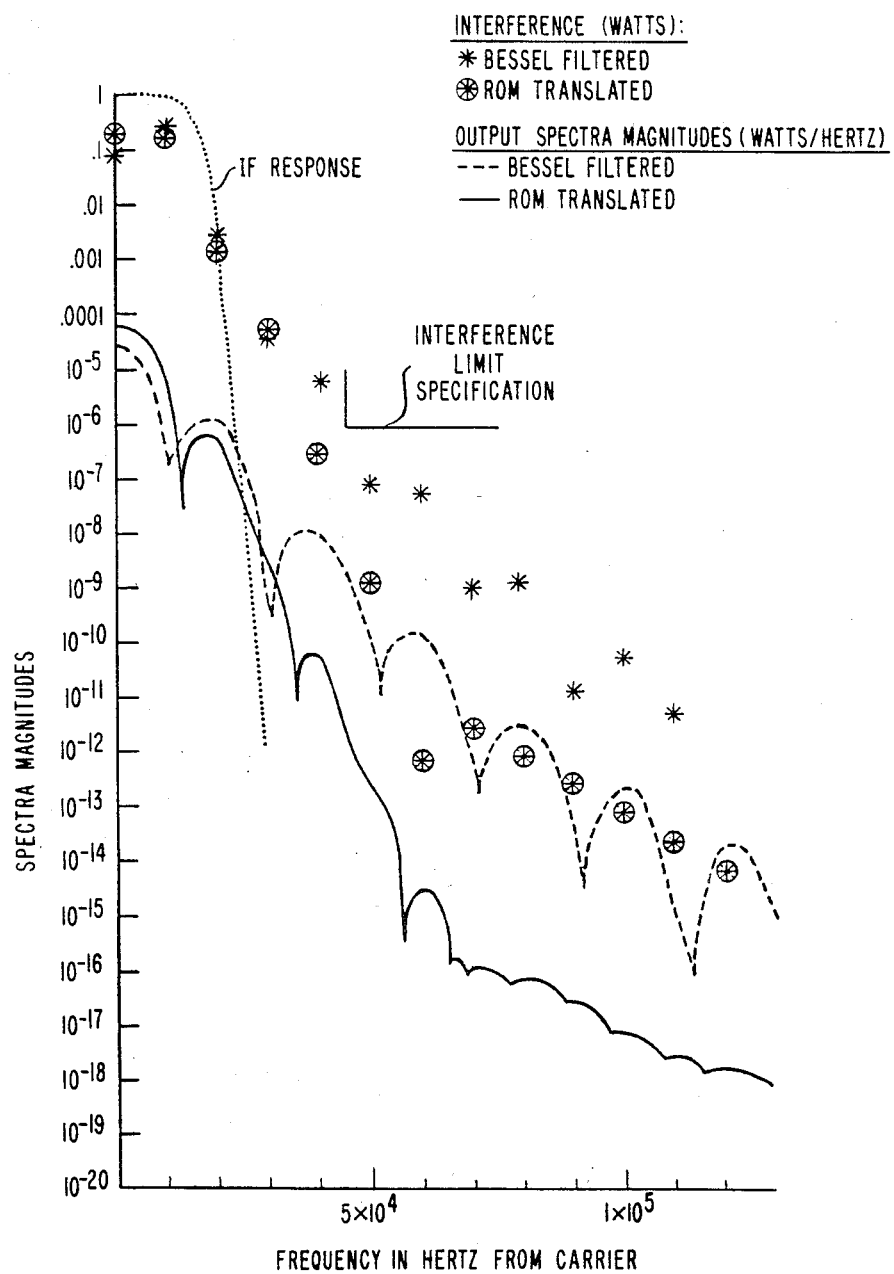
FIG. 2 is a diagram of processing circuit output signal spectrum magnitudes illustrating certain improvements achieved by the invention as compared to the aforementioned Bessel-filtered technique.
Figure 3:
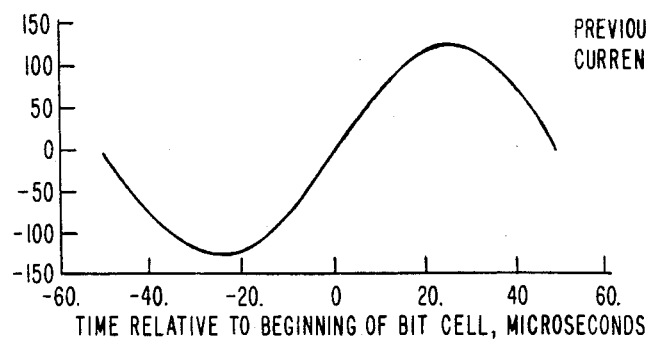
FIGS. 3-6 are diagrams of signal waveforms employed for performing signal processing in FIG. 1.

FIG. 2 depicts certain aspects of improvement realized in the circuit of FIG. 1 using a ROM translation as compared to a Bessel-filtered type of circuit previously mentioned herein. The figure is a plot of frequency spectra magnitudes versus frequency measured from a carrier frequency. In the figure, there are two references. One is a dotted curve, labeled "IF Response," which is a continuous spectrum in watts-per-Hz, representing the response of a typical intermediate frequency stage of a radio receiver (not shown) that may receive signals having the FIG. 1 Manchester output modulated thereon. The second reference is comprised of two solid lines at ninety degrees with respect to each other and labeled "Interference limit specification." The latter reference is a typical radio channel interference limit specification. Data points above and to the right of those perpendicular lines represent unacceptable interference, whereas data points to the left and below those lines represent interference which is tolerable.

In FIG. 2, the dashed line represents a Bessel-filtered signal continuous spectrum including substantial energy above about 35 kHz. The solid line curve represents the ROM translation continuous spectrum of the FIG. 1 embodiment; and, although it still includes some energy to the right of the IF Response reference, it includes much less energy in that region, and somewhat more energy below the 10-kHz data rate to the left of that reference as compared to the dashed curve. Consequently, the ROM translation version of the present invention produces an output which is significantly better matched in a frequency sense to the bandpass characteristics of circuits which will receive the data signal. That improved match tends to reduce the error rate.

In an interference sense, the data points represented by asterisks in FIG. 2 represent Bessel-filtered signal components, including the unmodulated carrier signal, near the top of the ordinate line, and the 10-kHz data signal component at the upper left-hand portion of the figure. All of the other asterisk data points represent harmonics of the 10-kHz signal; and it is seen that a substantial number of those harmonics, e.g., particularly those at the fifth and sixth harmonic frequencies, are close enough to the interference limit specification that component tolerances, small modulation nonlinearities, and similar effects can cause the limit to be exceeded. By contrast, however, the circled "X" marks, which represent the corresponding data points for the illustrative ROM translation of FIG. 1, are significantly below the interference limit specification.

FIGS. 3–6 illustrate four waveforms for the data stored in the ROM 10 to represent the $2^n$ 2-bit data sequences for the previous-bit/current-bit combinations 00, 10, 01, and 11, respectively. In each case, ordinates are in arbitrary amplitude units, which are proportional to current, of ROM 10 output. Time is represented on the abscissa and is indicated relative to the beginning of a bit cell. The beginning of such a bit cell is at the central, or zero, time location on that axis. Thus, in each figure, the waveform includes the waveform of the last half (to left of illustrated zero time) of the previous bit cell of the combination, followed by the waveform of the first half (to right of illustrated zero time) of the current bit cell. Accordingly, each waveform presents the bit-duration data signal transition wave between bit cells in a Manchester-encoded signal, i.e., the transition between the significant information representative signal transitions for the respective binary ONE or ZERO bit values indicated. Thus, two successive pairs of data bits at ROM inputs a7 and a8 include one bit in common, first as the current bit and then as the previous bit. Each such two bit pairs cause output from ROM 10 of two successive waveform sample sets; and the current-bit portion of one set and the previous-bit portion of the next set fully define an output bit cell corresponding to the mentioned common bit without need for combinatorial operations, either input or output, other than those normally associated with the addressing of a sample memory. For use of the memory sequential bit cell output in its digitally represented sample form is immediately available.

The illustrative signal waves of FIGS. 3-6 are advantageously derived to produce three effects. A first effect is the reproduction of the data information. For bit code conversion alone, output waves could be arbitrarily selected to reproduce the data information in the new bit code. However, in the course of that conversion, the invention advantageously lends itself to realizing one or more of at least two additional signal wave modifications. Thus, the second effect advantageously produced is an amplitude-limiting effect on the waveforms for the ONE-to-ZERO transition and the ZERO-to-ONE transition of FIGS. 4 and 5, respectively. Those two are amplitude-limited, illustratively at about ±110 amplitude units, because the transitions for ZERO-to-ZERO and ONE-to-ONE, which extend to about ±125 units in FIGS. 3 and 6, respectively, normally experience greater attenuation in radio receiving station filters. Hence, by imposing amplitude-limiting on the first two types of transition in the encoding operation at the transmitting station, the opportunities for having substantially equal data bit amplitude results for any of the transitions at the receiving station is greatly enhanced and, thereby, greatly reduces the likelihood of having data amplitudes as the receiving station which are data-pattern sensitive.

Figure 4:
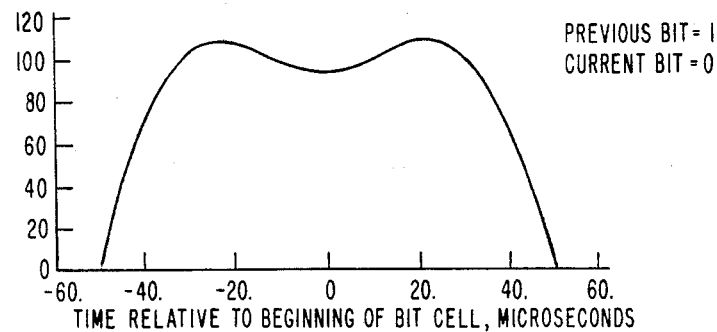
Figure 5:
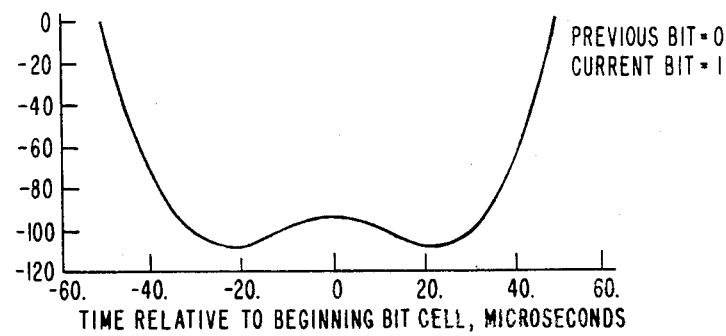
Figure 6:
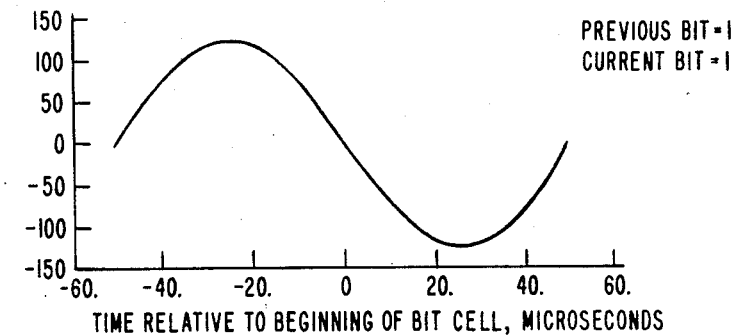

There is yet another aspect of the different-bit-type transitions. It is apparent from FIGS. 3 and 6 that the end of a ONE (zero time in FIG. 6) is negative-going, and the beginning of a ZERO (zero time in FIG. 3) is positive-going. In some prior systems, the filtering employed to contain the bandwidth of relatively rectangular data signals, e.g., a Manchester representation of NRZ data, causes intersymbol interference in the form of a large positive-going amplitude overshoot at a ONE-ZERO transition, and a similar negative-going overshoot for a ZERO-ONE transition. In a frequency modulated radio system, such overshoots can cause frequency deviations beyond prescribed regulatory limits, but any gain reductions implemented to contain them also reduce the other signal train portions and make them more error prone. This effect may be seen in FIG. 2 by the higher (by about 2.5 dB) spectral level in the 0-10 kHz off carrier region produced by the procedure described here. Corresponding improvements appear in FIGS. 4 and 5 in the form of the mentioned dimpling at time zero, and waveforms that are substantially symmetrical about time zero with bit center zero crossings, instead of overshoot and nonsymmetrical waves with zero crossing jitter (an intersymbol interference effect) as often characterizes Bessel filtered systems. However, as shown in FIGS. 4 and 5, those transitions are predistorted for gently dimpling the waveforms held in ROM 10 to prevent such overshoot problems. This predistortion not only limits the peak deviation in a manner which does not increase the out-of-band spectrum but also compensates for the typically greater receiver sensitivity to lower frequency modulation. This "dimpling" is both a correction for the intersymbol interference effects on peak deviation (removal of overshoot) and also a form of predistortion (dimpling in opposite direction from the overshoot) to compensate for the usual greater receiver sensitivity to lower frequency modulation. The "dimpling" seen in FIGS. 4 and 5 is thus larger than it would be to compensate for either problem by itself. Similar overshoot problems do not occur at mid-bit information transitions because successively selected waveform sample sets from ROM 10 always interface (in time) with a waveform half of the same bit type.

The third effect advantageously implemented in the ROM translation of the circuit in FIG. 1 is a band-limiting function, which accomplishes the aforementioned effect of confining a greater proportion of the data signal energy within the radio equipment passband than was heretofore the case. That translation also further reduces the magnitude of interference at harmonics of the data rate.

The derivative for the ROM output waves of FIGS. 3-6 utilizes known prolate spheroidal wave functions such as are denoted by $\psi_n(c,x)$ in equation (28) in the paper "Prolate Spheroidal Wave Functions, Fourier Analysis and Uncertainty—I" by D. Slepian and H. O. Pollak, appearing in the January 1961, *Bell System Technical Journal* at pages 43-63. Those functions are distinguished by the property that, of all functions of limited time duration and fixed energy, they have the most concentrated spectrum possible. With these functions, one can determine an optimum function combination for concentrating signal energy in a predetermined band, i.e., a desired channel band such as that between zero and 10 kHz from the carrier in FIG. 2. Such concentration of energy both reduces the amount of energy lost in channel separation filtering and reduces the likelihood of adjacent channel interference, e.g., in FIG. 2 in channels centered at 30 kHz and 60 kHz from carrier, the two next adjacent to the zero-kHz-off-carrier channel of the 10 kHz signal in 30 kHz steps. Letting $x=t$ and n indicate whether a binary ONE or ZERO is being considered, those functions are then utilized as described below to produce expressions for the four stored waves illustrated.

Initially define parameters as follows:

T is the duration of a bit cell (100 μS).

t is time-measured from the center of the current bit cell. The bit cell extends from $-(T/2) \leq t < T/2$. Consider only the range $0 \leq t < T$, that is the last half of the current bit cell and the first half of the subsequent bit cell.

The bandwidth of interest (here measured about zero but translatable by well known means to be centered about any desired carrier frequency) is denoted by W, $\Omega = 2\pi W$ and the time-bandwidth parameter c by $c = \Omega T/2$.

Functions giving a reasonable compromise between matching the receiver IF filters and reducing adjacent channel interference (for channel spacing = 30 kHz) are obtained with W = 18 kHz. Because these functions are intrinsically as close to band limited as possible for any function defined on a finite time segment, most of their energy is concentrated at frequencies within W Hertz of the carrier, i.e., in the I.F. passband, while only a tiny fraction of the transmitter energy causes interference in adjacent channels. As may be seen in FIG. 2, this fraction is significantly below relevant interference limits.

The waveform sample values in ROM 10 for different values of t for a ONE-to-ONE waveform sequence are given by:

$$f_{11}(t) = k\left[\psi_1\left(2c, \frac{t}{T}\right) - \psi_1\left(2c, 1 - \frac{t}{T}\right)\right]$$

where k is a constant chosen so that, at the maximum output level selected, $|f_{11}(t)| \leq 127$ so that effective use is made of the ROM 10. The corresponding waveform for a ZERO-to-ZERO bit sequence is:

$$f_{00}(t) = -f_{11}(t).$$

For the ONE-to-ZERO bit sequence, the waveform is defined by:

$$f_{10}(t) = k\left[\psi_1\left(2c, \frac{t}{T}\right) + \psi_1\left(2c, 1 - \frac{t}{T}\right) + \alpha \cdot \psi_0\left(c, \frac{2t}{T} - 1\right)\right].$$

In this equation, the constant $\alpha$ is used to control the relative amplitude of the $f_{11}(t)$ and $f_{10}(t)$ waveforms. This compensation is necessary because, as earlier indicated, the effective low-pass IF filter characteristic in a typical receiver results in a much higher deviation for ONE-to-ZERO and ZERO-to-ONE sequences than for ZERO-to-ZERO and ONE-to-ONE transitions. Because the latter sequences have lower effective deviation at the receiver output, their error performance is poorer. Additionally, because the peak deviation is constrained (by FCC regulation), the compensation gives better overall performance for a fixed peak deviation. Denote by r the ratio of deviation at the cell boundary time on a ONE-to-ZERO transition to peak deviation on a ONE-to-ONE transition. Then, $$\alpha = \frac{\frac{127}{k} r - 2\psi_1(2c, \frac{1}{2})}{\psi_0(c, 0)}.$$

For the values shown, r=0.75. The corresponding waveform for a ZERO-to-ONE bit sequence is:

$$f_{01}(t) = -f_{10}(t).$$

By designing the waveforms held in ROM 10 to include directly compensation for intersymbol interference and for anticipated transmission channel effects, some of which are different for different types of bit state sequences, and by having each held waveform include different compensated parts of time-adjacent bits, incoming data bits can be used directly to address the ROM; and its output sample sets can be used directly one at a time in final conversion to analog and in-line filtering without resort to complicated additional logical processing. In addition, an opportunity is opened to perform various types of signal processing functions using the relatively simple type of circuit illustrated and transferring a great deal of hardware complexity into appropriate stored waveform design. For example, waveforms can be designed for multiplexing plural input signal information streams or including low level modulation to facilitate clock recovery.

Although the present invention has been described in connection with a particular embodiment thereof, it is to be understood that additional applications, embodiments, and modifications, which will be apparent to those skilled in the art, are included within the spirit and scope of the invention.

What is claimed is:

1. A data signal processing apparatus comprising
means for holding plural data signal bit-duration waveform sample sets, each sample being a digitally encoded representation of a corresponding analog sample amplitude, each set including different parts of at least n time adjacent signal bits to be provided to an output of said apparatus, where n is a number of corresponding apparatus input signal bit information states of a data stream required to define the same information in said output, each set representing a different one of $2^n$ possible information bit state combinations for such n corresponding time-adjacent input bits to said apparatus, each sample set being further configured to include at least conversion between first and second predetermined data bit code representations of the same information, predistortion for anticipated transmission path effects unique to the particular combination of said time adjacent bits of said each sample set, and intersymbol interference compensation unique to said particular combination of time adjacent bits, and
means, responsive to successive overlapping sets of n input data signal bits of a data stream, each overlapping set including a current input data signal bit and a bit from a next previous overlapping set, for directly addressing said holding means to initiate readout of one of said waveform sample sets corresponding to the information bit state combination of the current-bit one of said overlapping sets.

2. The data signal processing apparatus in accordance with claim 1 in which there are provided in addition
means for transmitting each sample set read out of said holding means independently of previously or subsequently read sample sets therefrom.

3. The data signal processing apparatus in accordance with claim 1 in which said holding means comprises
means for holding plural groups of $2^n$ waveform sample sets, said groups of waveform sample sets differing from one another in regard to aspects which are independent of said information bit states, and
means for selecting among said groups of waveform sample sets one group to be responsive to said addressing means.

4. The data signal processing apparatus in accordance with claim 1 in which
said input data signal is a non-return-to-zero (NRZ) data signal and said output data signal includes a Manchester-encoded version of said NRZ data signal, and
said holding means includes means for holding $2^n$ of said waveform sample sets, each set including representations of a different pair of Manchester signal bit state mid-bit signal transitions and an intervening bit cell transition between time-adjacent data bits.

* * * * *